United States Patent
Chen et al.

(10) Patent No.: US 11,351,787 B2
(45) Date of Patent: Jun. 7, 2022

(54) CURVED FLUID EJECTION DEVICES

(71) Applicant: Hewlett-Packard Development Company, L.P., Spring, TX (US)

(72) Inventors: Chien-Hua Chen, Corvallis, OR (US); Michael W. Cumbie, Corvallis, OR (US); Si-Iam J. Choy, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/276,971

(22) PCT Filed: Nov. 21, 2018

(86) PCT No.: PCT/US2018/062302
§ 371 (c)(1),
(2) Date: Mar. 17, 2021

(87) PCT Pub. No.: WO2020/106295
PCT Pub. Date: May 28, 2020

(65) Prior Publication Data
US 2022/0032626 A1    Feb. 3, 2022

(51) Int. Cl.
| B41J 2/16 | (2006.01) |
| B41J 2/14 | (2006.01) |
| B29C 53/04 | (2006.01) |
| B29C 35/02 | (2006.01) |
| B29L 31/00 | (2006.01) |

(52) U.S. Cl.
CPC ............ *B41J 2/1637* (2013.01); *B29C 35/02* (2013.01); *B29C 53/04* (2013.01); *B41J 2/1408* (2013.01); *B29L 2031/767* (2013.01); *B41J 2202/20* (2013.01)

(58) Field of Classification Search
CPC ...... B41J 2/14072; B41J 2/04501; B41J 2/01; B41J 2/02; B41J 2/135; B41J 2/14; B41J 2/14008; B41J 2/14016; B41J 2/14201; B41J 2/14314; B41J 2/1637; B41J 2/1408; B41J 2202/20; B29C 35/02; B29C 53/04; B29L 2031/767
See application file for complete search history.

(56) References Cited

U.S. PATENT DOCUMENTS

| 5,538,677 | A | 7/1996 | Takahashi |
| 5,950,309 | A | 9/1999 | Bryce et al. |
| 6,386,684 | B1 | 5/2002 | Brennan et al. |
| 7,467,847 | B2 | 12/2008 | Baxter et al. |
| 9,630,407 | B1 | 4/2017 | Spence et al. |
| 2003/0085934 | A1 | 5/2003 | Tucker et al. |
| 2007/0126820 | A1 | 6/2007 | Silverbrook et al. |

(Continued)

FOREIGN PATENT DOCUMENTS

| CN | 101128301 | 2/2008 |
| WO | WO-2017065772 | 4/2017 |

*Primary Examiner* — Kristal Feggins
(74) *Attorney, Agent, or Firm* — Fabian VanCott

(57) ABSTRACT

A curved fluid ejection device may include a plurality of fluid ejection dies overmolded with at least one layer of epoxy mold compound (EMC). Each of the fluid ejection dies and the EMC include a coefficient of thermal expansion (CTE). The combination of the CTE of the fluid ejection dies and the CTE of the at least one layer of EMC defines a curve within the curved fluid ejection device.

15 Claims, 12 Drawing Sheets

(56) References Cited

U.S. PATENT DOCUMENTS

| | | |
|---|---|---|
| 2007/0206079 A1 | 9/2007 | Brown et al. |
| 2007/0222836 A1 | 9/2007 | Kim et al. |
| 2009/0058896 A1* | 3/2009 | Benjamin ............ B41J 2/04541 347/9 |
| 2009/0109268 A1 | 4/2009 | Yildirim et al. |
| 2018/0222202 A1* | 8/2018 | Mourey ............... B41J 2/17503 |
| 2019/0202206 A1* | 7/2019 | Ge ........................ B29C 64/209 |

* cited by examiner

CURVED FLUID EJECTION DEVICES

BACKGROUND

Printing devices contain a number of fluid ejection devices such as printheads used to dispense ink or another jettable fluid onto a print medium. The printheads include a number of dies that are precision dispensing devices that precisely dispense the jettable fluid to form an image on the print medium. The jettable fluid may be delivered via a fluid slot defined in the print head to an ejection chamber beneath a nozzle. Fluid may be ejected from the ejection chamber by, for example, heating a resistive element. The ejection chamber and resistive element form the thermal fluid ejection device of a thermal inkjet (TIJ) printhead. The printing devices may, however, use any type of digital, high precision liquid dispensing system, such as, for example, two-dimensional printing systems, three-dimensional printing systems, digital titration systems, and piezoelectric printing systems, among other types of printing devices.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
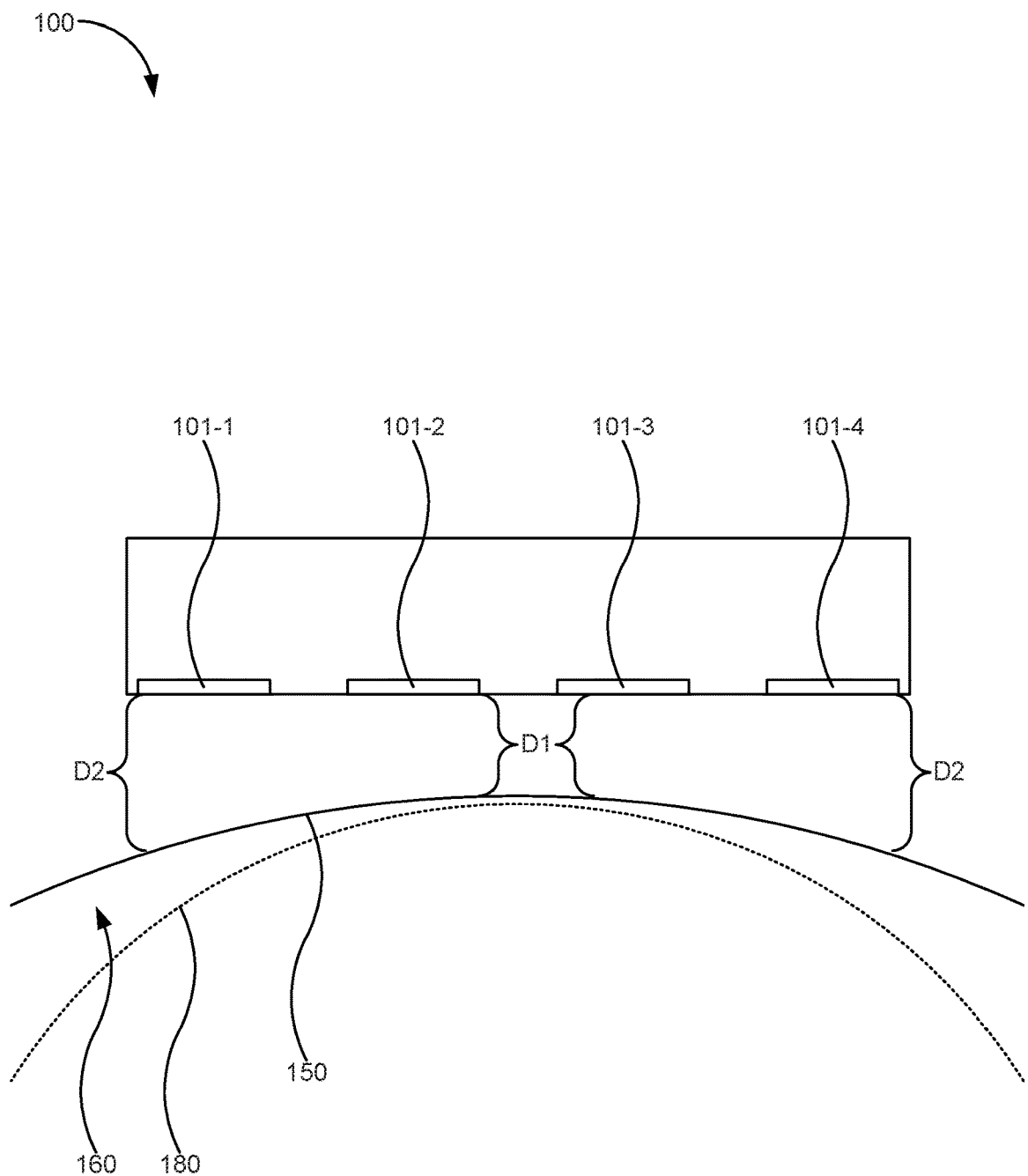
FIG. 1 is a block diagram of a printhead including collinear dies.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A print media path defines the path print media such as a web or paper takes during a printing process. During the printing process, a printing substance such as an ink or toner is deposited onto the print media. Within the print media path, the print media may be directed by a number of rollers that cause the print media to wrap around the rollers. The print media is eventually brought into printing interface with a printhead that dispenses the printing substance onto the print media. A roller may be included next to the printhead to direct the print media past the printhead.

The printhead may include a plurality of rows of printing dies that dispense the printing substance from the printhead. In some instances, the dies of the printhead may be collinear with one another. FIG. 1 is a block diagram of a printhead (100) including collinear fluid ejection dies (101-1, 101-2, 101-3, 101-4, collectively referred to herein as 101). Throughout the description, the terms "fluid ejection dies" and "dies" are used exchangeably to mean any device that ejects fluid from the printhead (100). The printhead (100) includes the dies (101) arranged collinearly with respect to one another. A roller (180) carries a print medium (150) such that the print medium (150) is placed next to the printhead (100) and its collinear dies (101). A gap (160) may exist between the print medium (150) and the roller (180). The gap (160) is created as the print medium (150) is pulled taunt across a top or crown of the roller (180) and is moved within a printing device via other rollers. In this manner, the radius of the curvature of the print medium (150) over the roller (180) may be greater than the radius of the roller (180) itself.

However, due to the curvature of the print medium (150) across the roller (180), the distances between the various dies (101) is different. For example, the distance D1 between dies (101-2, 101-3) and the print medium (150) is different than the distance D2 between dies (101-1, 101-4) and the print medium (150). Thus, the distances from individuals dies (101) varies from die-to-die. This difference in distances between the dies (101) and the print medium (150) may cause defects in the finished print when the dies (101) print a printing fluid onto the print medium (150). For example, dies (101-2, 101-3) may print in one manner onto the print medium (150), while the print substance dispensed by dies (101-1, 101-4) take more time to travel through the air between the dies (101-1, 101-4) and the print medium (150).

Further, dies (101-1, 101-4) are angled differently with respect to a surface of the print medium (150) as compared to the angle at which dies (101-2, 101-3) are positioned relative to the surface of the print medium (150). These and other differences between dies (101-1, 101-4) and dies (101-2, 101-3) and their positioning relative to the print medium (150) may cause blurring, stretching, distortions, or other print quality issues. Thus, a deviation of printhead (100) to print medium (150) spacing may be formed due to the collinear arrangement of the dies (101).

Examples described herein provide a curved printhead device may include a plurality of fluid ejection dies overmolded with at least one layer of epoxy mold compound (EMC). Each of the fluid ejection dies and the EMC include a coefficient of thermal expansion (CTE). The combination of the CTE of the fluid ejection dies and the CTE of the at least one layer of EMC defines a curve within the curved printhead.

The curve of the curved printhead device matches a radius of a print medium over a roller within a printing device. The at least one layer of EMC includes two layers of EMC. The two layers of EMC include a first layer of EMC having a first CTE, and a second layer of EMC having a second CTE. The degree of curvature of the curved printhead device may be defined by a thickness of a silicon layer of the ejection dies, a CTE of a silicon layer of the dies, a thickness of the first layer of EMC, the first CTE of the first layer of EMC, a thickness of the second layer of EMC, the second CTE of the second layer of EMC, a sequence of the first layer of EMC and the second layer of EMC within the curved printhead, the Young's modulus of the materials used within the layers of the printhead, changes in temperature such as during and after the curing process as the EMC layer(s) move from a cure temperature to a room temperature, the locations and relative positions of the layers of the printhead, and combinations thereof. The curved printhead device may include fluid feed channels formed in the at least one layer of EMC to feed a printing fluid to the fluid ejection dies.

Examples described herein also provide a printing system. The Printing system may include a roller to convey a print medium, and a fluid ejection device to eject fluid onto the print medium. The fluid ejection device may include a plurality of fluid ejection dies, a first epoxy mold compound (EMC) layer overmolding the plurality of fluid ejection dies, and a second EMC layer applied adjacent to the first EMC layer opposite the plurality of fluid ejection dies. The combination of a first CTE of the fluid ejection dies, a second CTE of the first EMC layer, and a third CTE of the second layer of EMC defines a curve in the fluid ejection device.

The curing of the first EMC and the second EMC causes the plurality of fluid ejection dies to be non-planar with respect to one another. The non-planar arrangement of the plurality of fluid ejection dies creates the curve in the fluid ejection device. The curve matches a radius of the print medium over the roller within the printing system. The degree of curvature of the fluid ejection device may be defined by thicknesses of the first EMC layer and the second EMC layer, the CTE of the fluid ejection dies, the first EMC layer and the second EMC layer, a position of the first EMC layer and the second EMC layer relative to the fluid ejection dies, the Young's modulus of the materials used within the layers of the printhead, changes in temperature such as during and after the curing process as the EMC layer(s) move from a cure temperature to a room temperature, the locations and relative positions of the layers of the printhead, and combinations thereof. The curve maintains each of the fluid ejection dies equidistant from the print medium.

Examples described herein also provide a method of manufacturing a fluid ejection device. The method may include overmolding a plurality of fluid ejection dies within at least a first epoxy mold compound (EMC), and curing the first EMC. A coefficient of thermal expansion (CTE) of the at least first EMC defines a curve within the fluid ejection device.

The method may include placing a second EMC adjacent to the first EMC opposite the plurality of fluid ejection dies, and curing the second EMC. At least the CTE of the first EMC layer and a CTE of the second EMC layer causes the plurality of fluid ejection dies to be non-planar with respect to one another.

The method may include placing the plurality of fluid ejection dies and the first EMC as overmolded into a mold, and curing the first EMC. The mold defines the degree of curvature of the fluid ejection device. The method may include forming fluid feed channels in the fluid ejection device. The degree of curvature of the curved printhead device is defined by a thickness of the fluid ejection dies, a CTE of the material of the fluid ejection dies, a thickness of a layer of the first EMC, the CTE of the first EMC, a thickness of a second layer of EMC applied to a side of the first EMC opposite the plurality of fluid ejection dies, a CTE of the second layer of EMC, a sequence of the first layer of EMC and the second layer of EMC within the curved printhead, the Young's modulus of the materials used within the layers of the printhead, changes in temperature such as during and after the curing process as the EMC layer(s) move from a cure temperature to a room temperature, the locations and relative positions of the layers of the printhead, and combinations thereof.

As used in the present specification and in the appended claims, the term "coefficient of thermal expansion (CTE)" is meant to be understood broadly as a measure of the fractional change in size per degree change in temperature at a constant pressure. The CTE describes how the size of an object changes with a change in temperature. CTE may be measured in parts-per-million per degree Celsius (ppm/° C.). Substances expand or contract when their temperature changes, with expansion or contraction occurring in all directions. Substances that expand at the same rate in every direction are called isotropic. For isotropic materials, the area and volumetric thermal expansion coefficient are, respectively, approximately twice and three times larger than the linear thermal expansion coefficient.

If the body of the substance is free to expand, the expansion or strain resulting from an increase in temperature may be calculated by using the applicable CTE of that substance. If the body is constrained so that it cannot expand, then internal stress will be caused or changed by a change in temperature. This stress may be calculated by considering the strain that would occur if the body were free to expand and the stress required to reduce that strain to zero, through the stress/strain relationship characterized by the elastic or Young's modulus.

In the examples described herein, the CTE of the dies and thermosetting materials such as epoxy mold compounds (EMC) that are overmolded around the dies are used to form a printhead that includes a curved form factor. The measurement of CTE occurs over a temperature range so the 'ppm' of expansion may be converted to a 'ppm/T' value where T is the temperature unit. By reporting the dimension change per unit of temperature, it is possible to compare values for different materials using the same temperature units and comparing the CTEs of the dies and the EMC layer or layers. Some EMC materials have CTEs around 50 ppm/° C. below the glass transition temperature (Tg). If the system has filler in it, the CTE can be lower due to the very low expansion of the filler component. Above the Tg, the CTE may be around 100 to 150 ppm/° C.

Figure 2:
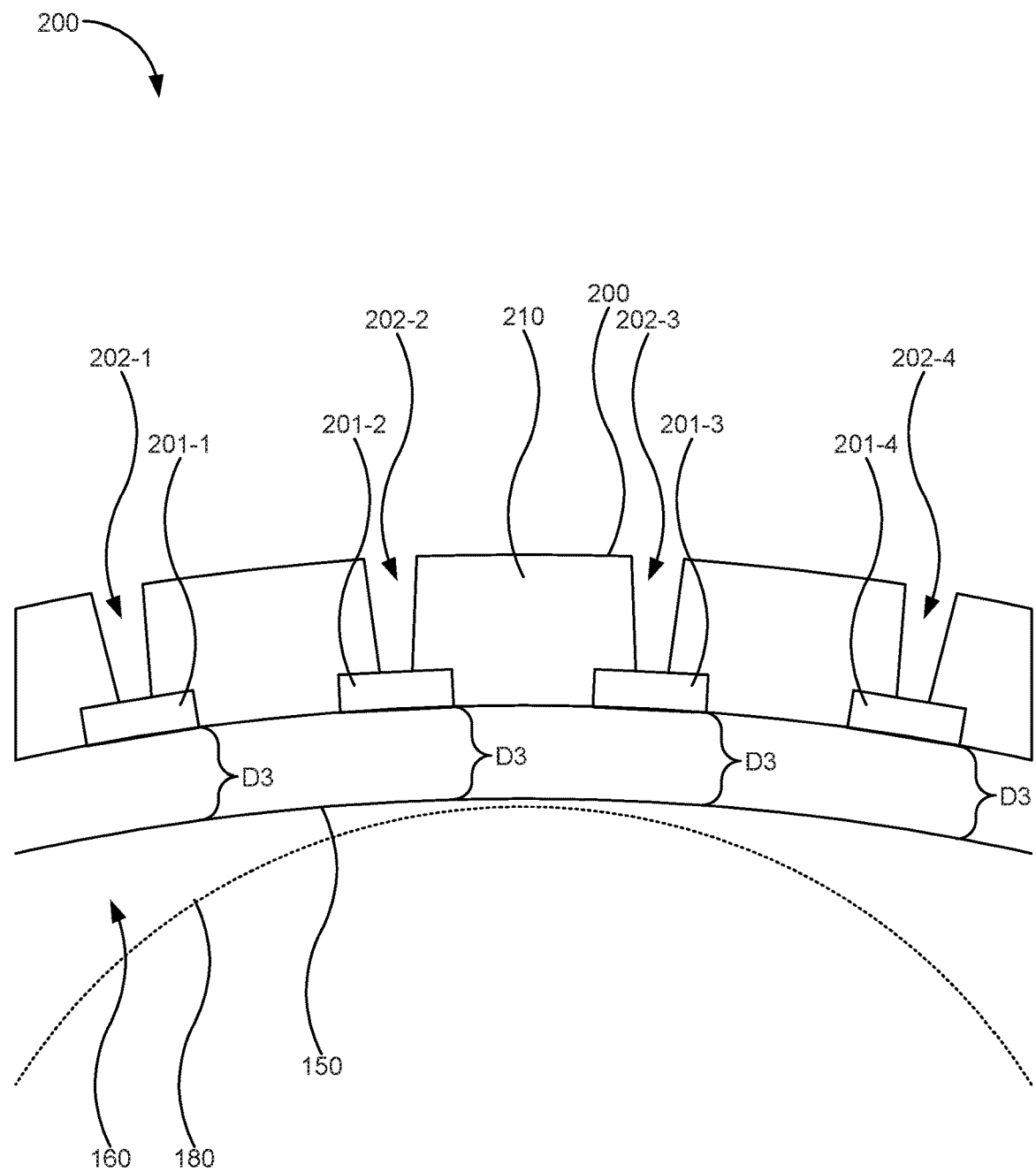
FIG. 2 is a block diagram of a curved printhead including dies that curve with respect to a surface of a print medium, according to an example of the principles described herein.

Turning again to the figures, FIG. 2 is a block diagram of a curved printhead (200) including dies (201-1, 201-2, 201-3, 201-4, collectively referred to herein as 201) that curve with respect to a surface of a print medium (150), according to an example of the principles described herein. In the examples described herein, the dies (201) may eject different substances such as, for example, different colors of printable fluid such as cyan (C), magenta (M), yellow (Y), and black (B).

In order to ensure that each of the dies (201) are equidistant from the print medium (150) as opposed to collinear as depicted in FIG. 1, the printhead (200) may include a curved form factor that matches a radius of the print medium (150) created by the roller (180) and the movement of the print medium (150) over the roller (180). In particular, one layer of EMC (210) with a CTE different than the dies (201) or a plurality of layers of EMC (210) with different CTEs with respect to one another and the dies (201) may be included in the printhead (200) in order to create the curve within the printhead (200). When the CTE of the dies (201) and the at least one EMC layer (210) are different or when the CTE of the plurality of EMC layers (210) includes one relatively higher CTE material and one relatively lower CTE material, the surface of the printhead (200) will form a concave shape from side of the printhead (200) on which the dies (201) are located. The material of the dies (201) and the material of the EMC layer(s) (210) may be tuned or selected to create the curve of the printhead (200) such that the curve matches the curvature of the print medium (150) around the roller (160).

In FIG. 2, element 210 indicates an overmold of the dies (201), and may include at least one, and in some examples, a plurality of layers of a resin such as an epoxy mold compound (EMC). By overmolding the dies (201), the dies (201) may be made smaller resulting in less cost in manufacturing the printhead (200) by eliminating large amounts of relatively more expensive materials such as silicon from which the dies (201) are made. Thus, the use of sliver dies (201) along with the overmold material greatly decreases manufacturing costs, and, in the examples described herein, are able to be modified to create a curvature in the printhead (200) that matches a curvature of a print medium (150) as curved over a roller (180).

In the examples described herein, the dies (201) may be positioned within the EMC layer(s) at a 1,524 micrometer (μm) pitch. Further the dies (201) may be embedded in 500 μm thick EMC layer(s). In an example, the dies (201) may be sliver dies. A sliver die may include a thin silicon, glass, or other substrate having a thickness on the order of approximately 650 μm or less, and a ratio of length to width (L/W) of at least three.

In examples where the printhead (200) includes a single layer of EMC (210), the CTE of the single layer of EMC (210), the CTE of the dies (201), the thickness of a layer of the dies (201) such as a silicon layer of the dies (201), a thickness of the single layer of EMC (210), the Young's modulus of the materials used within the layers of the printhead, changes in temperature such as during and after the curing process as the EMC layer moves from a cure temperature to a room temperature, the locations and relative positions of the layers of the printhead, and combinations thereof may determine whether the printhead (200) has a concave, flat, or convex curvature, and may determine the degree of curvature of the printhead (200). In examples where the printhead (200) includes two layers of EMC (210), the CTE of the first layer and second layer of the EMC (210), the CTE of the dies (201), the order or sequence at which the two layers of EMC (210) are positioned with respect to the dies (201), the thickness of a layer of the dies (201) such as a silicon layer of the dies (201), a thickness of the first layer of EMC (210), a thickness of the second layer of EMC (210), the Young's modulus of the materials used within the layers of the printhead, changes in temperature such as during and after the curing process as the EMC layers move from a cure temperature to a room temperature, the locations and relative positions of the layers of the printhead, and combinations thereof may determine whether the printhead (200) has a concave, flat, or convex curvature, and may determine the degree of curvature of the printhead (200). Table 1 describes the manner in which the CTE of the various layers of the printhead (200) may affect the curvature of the printhead (200).

TABLE 1

Experimental results of EMC layering to achieve curvature of the printhead using the CTE of the layers.

| 1 | 2 | 3 | 4 | 5 | 6 | 7 | 8 | 9 |
|---|---|---|---|---|---|---|---|---|
| 1 | 47 | 25% | 141 | 75% | 730/771 | −6 | −6 | Convex |
| 2 | 94 | 50% | 94 | 50% | 730/771 | −2 | −4 | Convex |
| 3 | 141 | 75% | 47 | 25% | 730/771 | −2 | −1 | Convex |
| 4 | 188 | 100% | 0 | 0% | 771 | 0 | 0 | Flat |
| 5 | 0 | 0% | 188 | 100% | 730 | 0 | 0 | Flat |
| 6 | 47 | 25% | 141 | 75% | 771/730 | 2 | 2 | Concave |
| 7 | 141 | 75% | 47 | 25% | 771/730 | 5 | 5 | Concave |
| 8 | 94 | 50% | 94 | 50% | 771/730 | 1 | 1 | Concave |

The experimental data included within Table 1 includes data pertaining to a printhead (200) that includes two separate layers of EMC. In the experimental results provided in Table 1, column 1 indicates the run, and column 2 indicates the weight in grams of a first layer of EMC. Column 3 indicates the percentage of SUMIKON® G771 epoxy mold compound manufactured and distributed by Sumitomo Bakelite Co., Ltd. relative to a percentage of SUMIKON® G730 epoxy mold compound manufactured and distributed by Sumitomo Bakelite Co., Ltd. Column 4 indicates the weight in grams of a second layer of EMC. It is noted that the weight in grams of the first layer indicated in column 2 and its percentage indicated in column 3 varies through the runs as does the weight in grams of the second layer indicated in column 4 and its percentage indicated in column 5. Column 5 indicates the percentage of SUMIKON® G730 epoxy mold compound manufactured and distributed by Sumitomo Bakelite Co., Ltd. relative to a percentage of SUMIKON® G771 epoxy mold compound manufactured and distributed by Sumitomo Bakelite Co., Ltd. Column 6 of Table 1 indicates an order at which the SUMIKON® G730 EMC and the SUMIKON® G771 EMC are layered within the printhead (200), and indicates whether the SUMIKON® G730 or the SUMIKON® G771 is closest to and abutting the dies (201). Column 7 of Table 1 indicates the curvature or bow of the non-cured or partially-cured printhead in millimeters relative to a flat surface. Column 8 of Table 1 indicates the curvature or bow of the cured printhead in millimeters relative to a flat surface. Column 9 indicates the direction of curvature or bow, with the dies (201) being the reference. In one example, a relatively higher CTE EMC may be placed adjacent to the dies (200) such that the relatively higher CTE EMC overmolds the dies (200), and a relatively lower CTE EMC may be placed adjacent the relatively higher CTE EMC and away from the dies (200). This order of high and low CTE EMCs creates a curvature in the printhead (200) where the dies (201) are angled or otherwise non-planar with respect to one another at curing. The angle of the plurality of dies (201) create the curve in the curved printhead (200). The curve of the printhead (200) may be tuned to match a radius of the print medium (150) over a roller (180) within a printing device.

In Table 1, run numbers 1 through 3 provide a convex curvature within the printhead (200) wherein the dies (201) are located on the exterior of the curve. In run numbers 4 and 5, the printhead does not include a curve, and are instead flat. In runs 6 through 8, the curvature of the printhead (200) is concave wherein the dies (201) are located on an exterior of the curve. In runs 6 through 8, the dies (201) are arranged in a non-planar orientation such that they may curve around the curvature of the print medium (150) that is moved around the roller (180). Thus, in examples where a relatively higher CTE EMC is placed closest to the dies (201) with a relatively lower CTE EMC placed adjacent the relatively higher CTE EMC, the printhead (200) and its dies (201) will form a concave curvature suitable to curve around the print medium (150). In one example, the relatively higher CTE EMC placed closest to the dies (201) may have a CTE of approximately 13 ppm/° C. In this example, the relatively lower CTE EMC placed adjacent the relatively higher CTE EMC may have a CTE of approximately 8 ppm/° C. Further, in this example the CTE of the silicon (Si) used within the dies (201) may be approximately 3.1 ppm/° C. This creates a printhead (200) that includes a concave curvature where the dies (201) are located on the interior of the curve and where the curve matches a radius of the print medium (150) created by the roller (180). In an example where a single layer of EMC (210) is used, the CTE of the dies (201) may again be 3.1 ppm//° C. and the CTE of the single layer of EMC (210) may be relatively lower in order to create the concave curvature.

In the examples described herein, the dies (201) may be formed from silicon (Si). In another example, the dies (201) may be formed from glass or other materials instead of or in combination with silicon. For example, the printheads (200) described herein may include some dies (201) formed from silicon and some dies formed from another material such as glass. Further, in still another example, the layers of EMC described herein may include other materials inserted therein that change the CTE of the layers in order to achieve a certain curvature of the printhead (200). Thus, the dies (201) may be made of different materials in order to adjust the CTE of a die layer within the printhead (200) and influence the curvature of the cured printhead (200).

As mentioned herein, the Young's modulus may also influence the curvature of the printhead (200) and the materials such as the EMC layer(s) may be selected based on their Young's modulus. The Young's modulus of a materials is the measure of the mechanical property of stiffness of a solid material, and defines the relationship between stress (i.e., force per unit area) and strain (i.e., proportional deformation) in a material in the linear elasticity regime of a uniaxial deformation. Young's modulus may be expressed using the following equation:

$$E = \frac{\sigma}{\varepsilon}$$

where E is the Young's modulus in pascals, σ is the uniaxial stress or uniaxial force per unit surface in pascals, and ε is the strain or proportional deformation (i.e., change in length divided by the original length. The Young's modulus may be expressed in megapascals (MPa or N/mm$^2$) or gigapascals (GPa or kN/mm$^2$). The Young's modulus for the silicon dies (201) may be approximately five to ten times that of the EMC layer(s). Further, the range of Young's moduli for the EMC layer(s) may be dependent on the filler, filler concentration, and type of epoxy included within the EMC layer(s). These factors and others, alone and in combination, may be considered when selecting and processing the materials within the printhead (200) in order to create a curve in the printhead (200).

Further, the change in the temperatures of the materials within the printhead (200) may influence the curvature of the printhead (200). For example, the EMC layer(s) may be cured through exposure to electromagnetic radiation, heat, or other curing energy, and the curing temperatures at which each of the materials within the layers cure may influence the curvature of the printhead (200). Further, in examples where multiple layers of EMC are used within the printhead (200), one layer may be pre-cured or partially cured separate from a curing of a second layer. This sequencing of the curing of the layers may also affect the curvature of the printhead (200). Still further, the interplay between the different Young's moduli and temperature curves of each of the materials within the printhead (200) may influence the curvature of the printhead (200). All of these factors and others, alone and in combination, may be considered when selecting and processing the materials within the printhead (200) in order to create a curve in the printhead (200).

The curved printhead (200) may also include fluid feed channels (202-1, 202-2, 202-3, 202-4, collectively referred to herein as 202) formed in the at least one layer of EMC. The fluid feed channels (202) serve to feed a printing fluid to the fluid ejection dies (201). In one example, the fluid feed channels (202) may be formed by removing the at least one layer of EMC (210) to form the fluid feed channels (202). Removal of the at least one layer of EMC (210) may include cutting, mechanical etching, chemical etching, or other material removal processes. In another example, the fluid feed channels (202) may be formed through a molding process where the non-ejection sides of the dies (201) are interfaced with a protruding portion of a mold.

Figure 9:
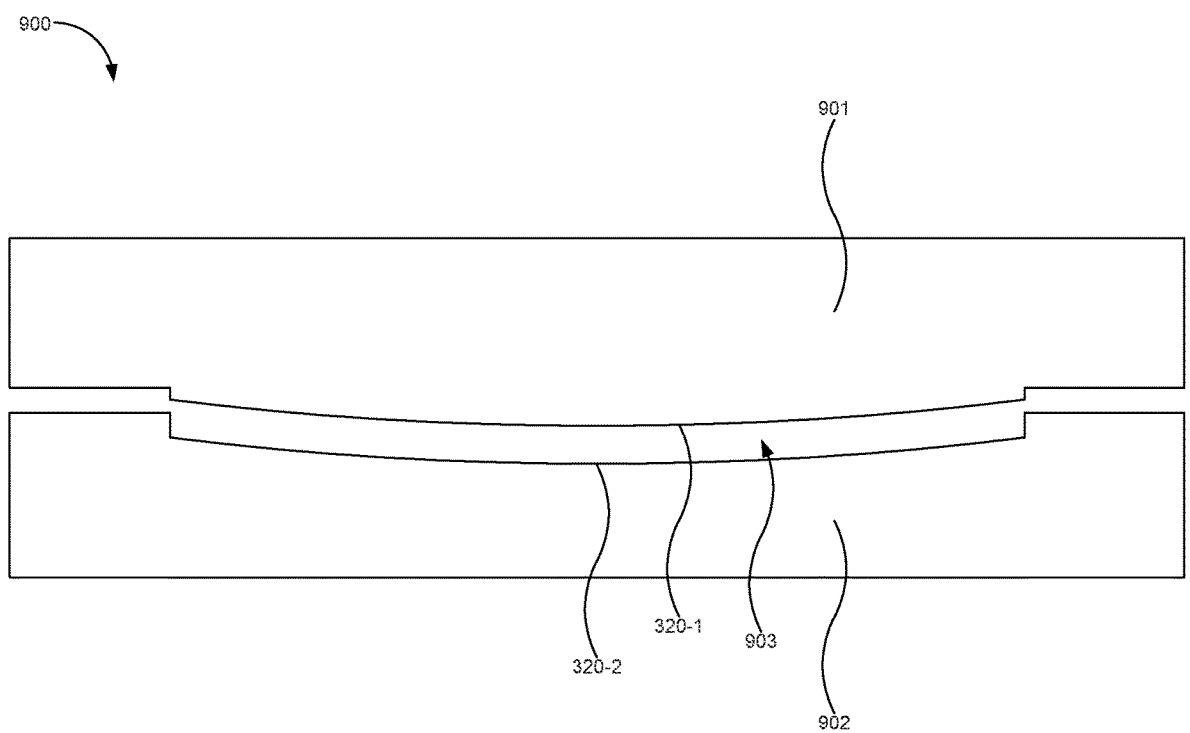
FIG. 9 is a block diagram of a mold for use in shaping a printhead, according to an example of the principles described herein.

In one example, the curvature of the printhead (200) may be formed by placing the layer(s) of EMC (210) and the dies (201) into a mold that is shaped to include a curve as depicted in FIG. 9. In this example, the mold cavity with its curved surfaces may be used to shape the printhead (200) alone or in combination with the layers(s) of EMC (210) with their respective CTEs. The type of molding processes used in connection with this example of molding may include, for example, compression molding, transfer molding, injection molding, or combinations thereof.

The arrangement of the dies (201) and the process used to form the curved printhead (200) causes the plurality of fluid ejection dies (201) to be non-planar with respect to one another at curing of the at least one layer of EMC (210). The non-planar arrangement of the plurality of fluid ejection dies (201) creates a curve in the curved printhead device (200). More details regarding single and double layers of EMC (210) within the printhead (200) and the process by which the printhead (200) in these two examples are formed are provided herein in connection with FIGS. 3 through 5B and 6 through 8B, respectively.

FIGS. 3 through 5B are a series of block diagrams of a method of manufacturing a fluid ejection device such as a printhead (300), according to an example of the principles described herein. Specifically, FIGS. 3 through 5B depict the method of manufacturing the printhead (300) using a single layer of EMC (301) and relying on the CTE of the dies (201) and the single layer of EMC (301) to form a curve in the printhead (300).

Figure 3:
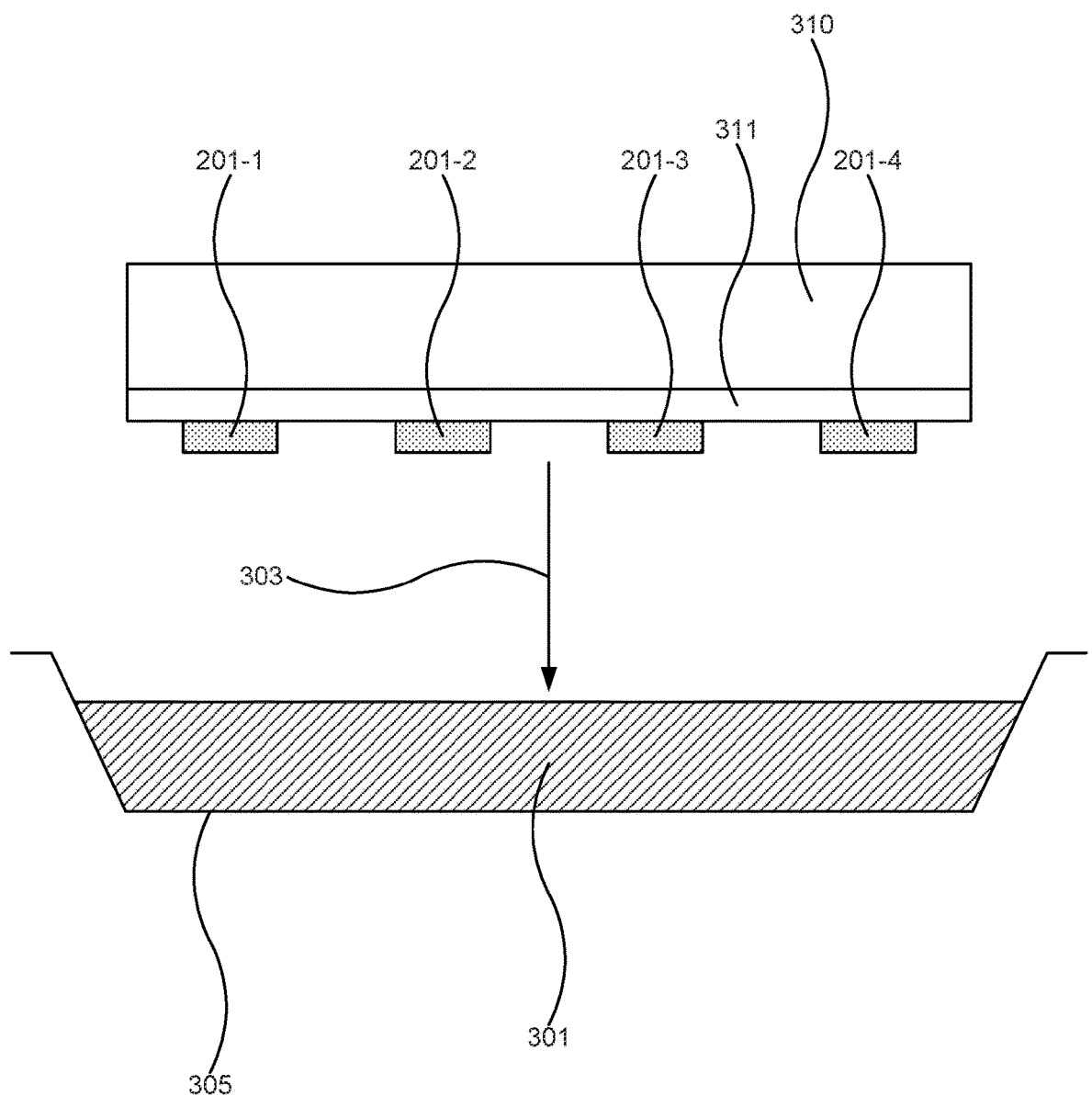
FIGS. 3, 4A-4B, and 5A-5B are a series of block diagrams of a method of manufacturing a fluid ejection device, according to an example of the principles described herein.

Beginning at FIG. 3, a number of dies (201) are adhered to a temporary substrate (310) via an adhesive layer (311). The temporary substrate (310) and adhesive layer (311) are used to correctly position and align the dies (201) with respect to one another. A reservoir of EMC material may be placed in a receptacle (305). In the example of FIGS. 3 through 5B, the EMC material (305) may have a CTE that is relatively higher than the CTE of the dies (201). In this situation, the CTE difference will cause the printhead (300) and its dies (201) to form a concave curvature suitable to curve around the print medium (150) as the print medium (150) is moved by the roller (180).

The dies (201) are then brought into contact with the single layer of EMC (301) as depicted by arrow 303, and the EMC (301) is allowed to cure. "Curing" as used herein in the context of polymer chemistry and process engineering refers to the toughening or hardening of a polymer material by cross-linking of polymer chains, brought about by electron beams, heat, or chemical additives. The viscosity of, for example, the EMC drops initially upon the application of electron beams, heat, or chemical additives, passes through a region of maximum flow and begins to increase as the chemical reactions increase the average length and the degree of cross-linking between the constituent oligomers. This process continues until a continuous 3-dimensional network of oligomer chains is created that is referred to as gelation. In terms of processability of the EMC, before gelation the EMC may be relatively mobile, and after gelation the mobility is limited. At this point, the microstructure of the EMC. Thus, in order to achieve vitrification in the EMC, the process temperature may be increased after gelation.

Figure 4A:
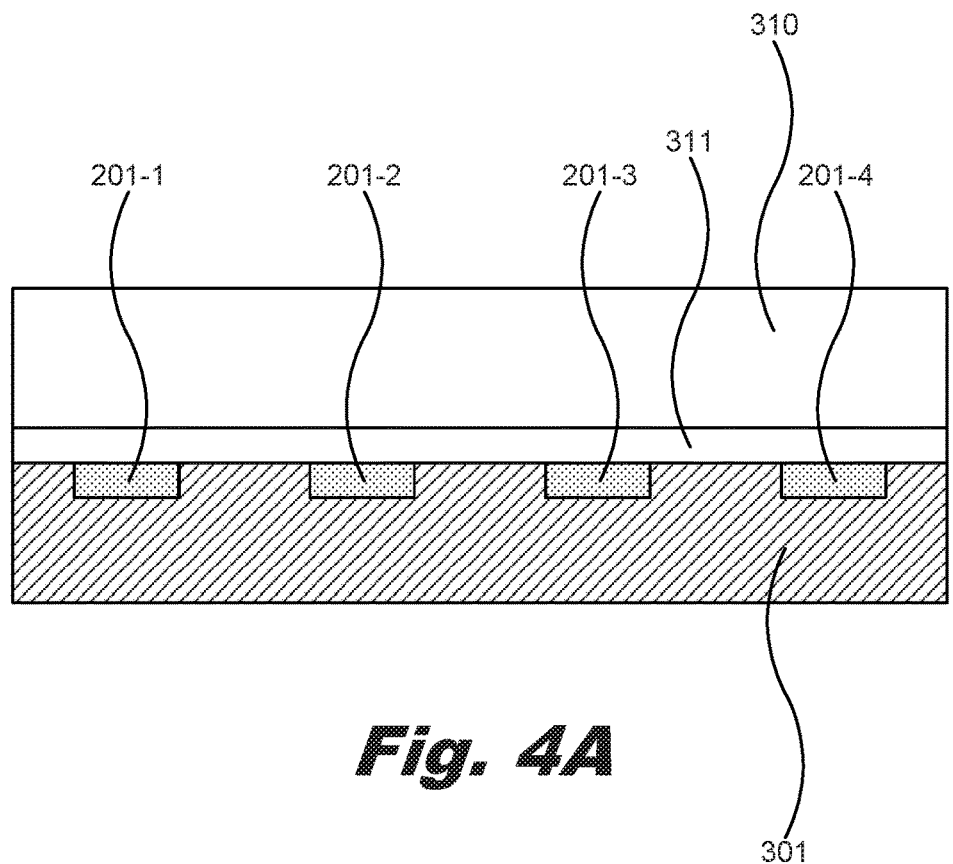
Figure 4B:
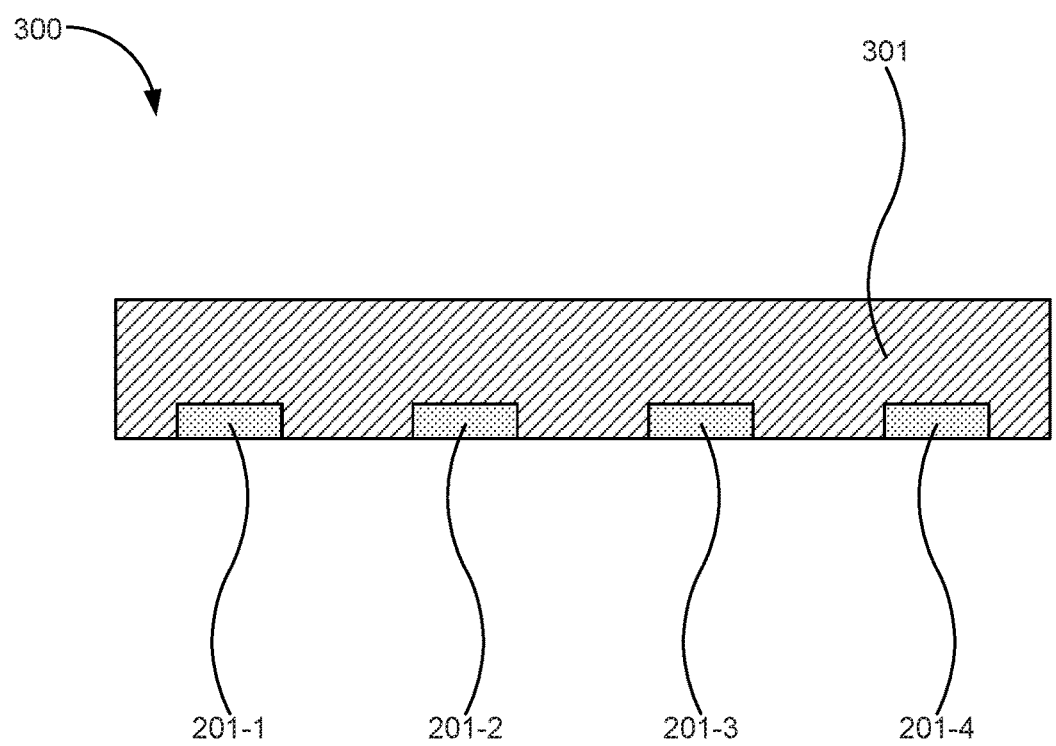

A partially cured EMC layer (301) is depicted in FIG. 4A where the dies (201) are overmolded with the EMC layer (301) and the temporary substrate (310) is adhered to the dies (201) and the EMC layer (301) via an adhesive layer (311). In FIG. 4B, the adhesive layer (311) and temporary substrate (310) are removed. The orientation of the dies (201) and the EMC layer (301) is flipped about the horizontal axis between FIGS. 4A and 4B.

Figure 5A:
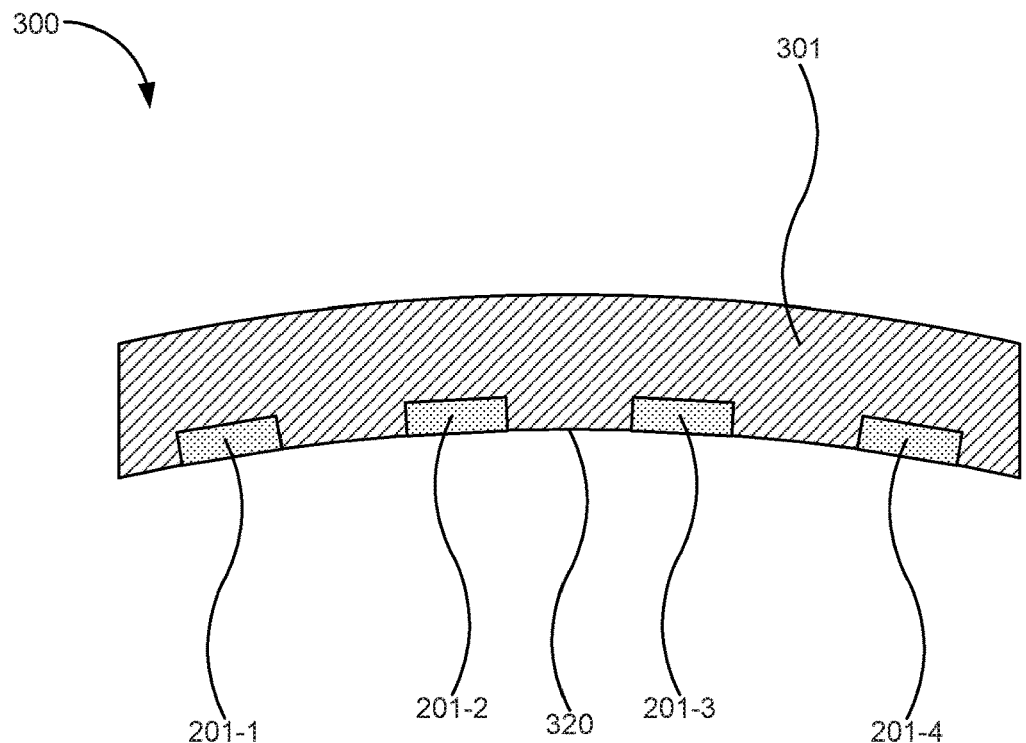
Figure 5B:
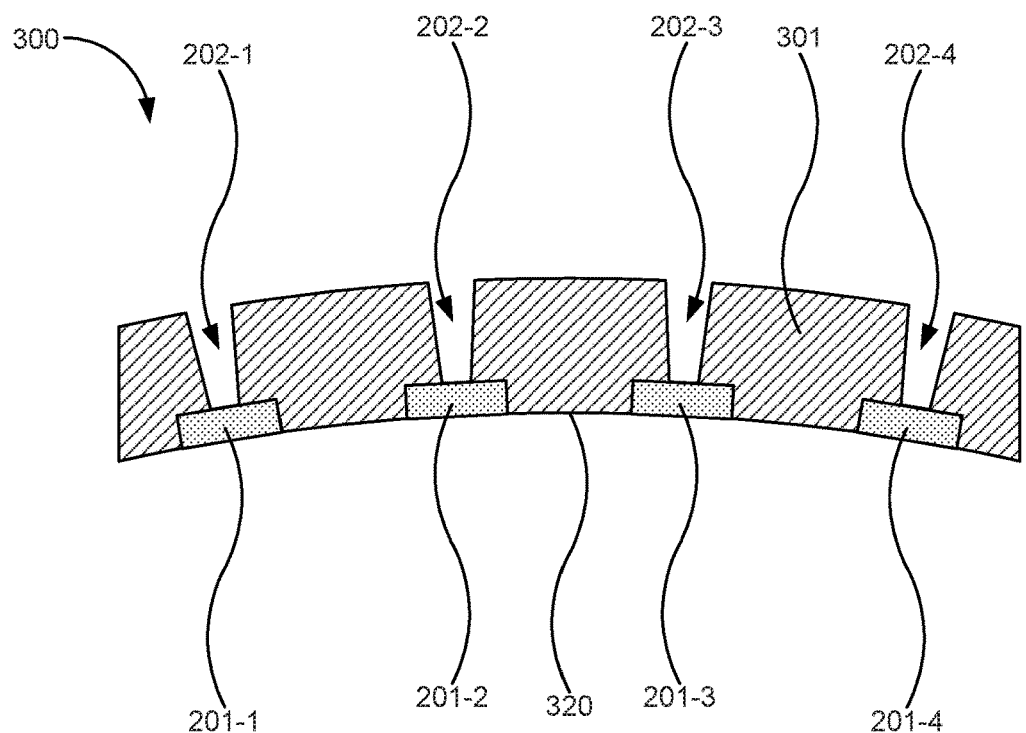

In FIG. 5A, the EMC layer (301) has fully cured. Due to the CTE difference between the material of the dies (201) and the EMC of the EMC layer (301) a curvature (320) is created in the printhead (300). Specifically, the EMC layer (301) may have a relatively higher CTE relative to the dies (201). In the example of FIGS. 3 through 5B where a single layer of EMC (310) is used, the CTE of the dies (201) may again be 3.1 ppm//° C. and the CTE of the single layer of EMC (310) may be relatively higher. However, in order to create the concave curvature (320) in the printhead (300) to match the curvature of the print medium (150), the layer occupied by the dies (201) may be doped through the inclusion of a relatively higher CTE component that has a CTE value that is relatively higher than the CTE of the single layer of EMC (310) or include an EMC (310) that has a relatively lower CTE than the die s(201). In this example, a number of components that include a relatively higher CTE than the EMC (310) such as, for example, a leadframe, glass, or other materials placed within or next to the dies (201) may raise the CTE of the layer within the printhead (300) that includes the dies (201) may cause the appropriate curvature in the printhead (300). The inclusion of the relatively higher CTE components are indicated with the shading within elements 201. In this arrangement, after the dies (201) with their included high CTE components and the single EMC layer (301) are released from the receptacle (305) between FIGS. 3 and 4A, the printhead (300) may be flat because the CTE of the silicon of the dies (201) assist in balancing out the shrinkage with the single layer of EMC (310) during cooling. However, as the printhead (300) cools and the single layer of EMC (310) continues to cross-link, the printhead (300) will begin to form the curve (320) as depicted in FIGS. 5A and 5B.

As depicted in FIG. 5B, fluid feed channels (202) formed in the at least one layer of EMC. The fluid feed channels (202) serve to feed a printing fluid to the fluid ejection dies (201). In one example, the fluid feed channels (202) may be formed by removing portions of the single layer of EMC (301) to form the fluid feed channels (202). Removal of the portions of the single layer of EMC (301) may include cutting, mechanical etching, chemical etching, or other material removal processes. In another example, the fluid feed channels (202) may be formed through a molding process where the non-ejection sides of the dies (201) are interfaced with a protruding portion of a mold.

FIGS. 6 through 8B are a series of block diagrams of a method of manufacturing a fluid ejection device (400), according to an example of the principles described herein. Specifically, FIGS. 6 through 8B depict the method of manufacturing the printhead (400) using two layers of EMC (401, 402) and relying on the CTE of the dies (201) and the two layers of EMC (401, 402) to form a curve in the printhead (300).

Figure 6:
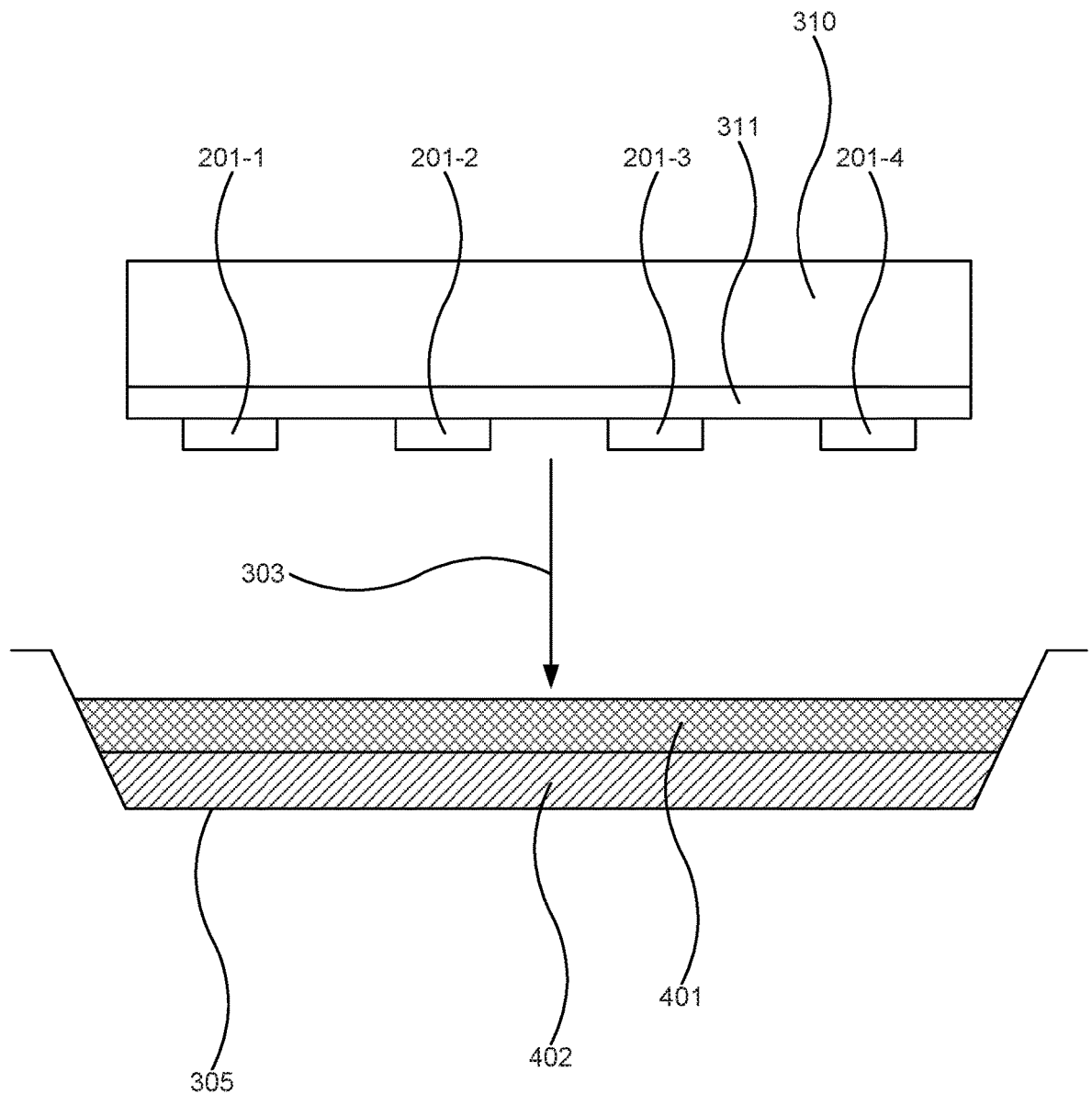
FIGS. 6, 7A-7B, and 8A-8B are a series of block diagrams of a method of manufacturing a fluid ejection device, according to an example of the principles described herein.

Beginning at FIG. 6, a number of dies (201) are adhered to a temporary substrate (310) via an adhesive layer (311). The temporary substrate (310) and adhesive layer (311) are used to correctly position and align the dies (201) with respect to one another. A reservoir of EMC material may be placed in a receptacle (305). In the example of FIGS. 6 through 8B, the reservoir of EMC material includes a first EMC material used to form a first EMC layer (401) that is located adjacent to and overmolds the dies (201). In this example, the reservoir of EMC material includes a second EMC material used to form a second EMC layer (402) that is located adjacent to the first EMC layer (401) opposite the side of the first EMC layer (401) adjacent the dies (201). In the example of FIGS. 6 through 8B, the EMC material of the first EMC layer (401) may have a CTE that is relatively higher than the EMC material used to form a second EMC layer (402). Further, the CTE of the dies (201) may be relatively lower than both the first and second EMC layers (401, 402). In this situation, the CTE differences will cause the printhead (400) and its dies (201) to form a concave curvature suitable to curve around the print medium (150) as the print medium (150) is moved by the roller (180).

The dies (201) are then brought into contact with the EMC materials that form the first and second EMC layers (401, 402), and the EMC materials are allowed to cure. In one example, the first and second EMC layers (401, 402) are overmolded around the dies (201) simultaneously such that both EMC layers (401, 402) are cured simultaneously. In another example, the first EMC layer (401) is allowed to cure, and the second EMC layer (402) is applied to the first EMC layer (401). In this example, the second EMC layer (402) may be applied to the first EMC layer (401) before the first EMC layer (401) is completely cured and is tacky. This allows the second EMC layer (402) to adhere to the first EMC layer (401), and allows the CTEs of the first and second EMC layers (401, 402) to interact with one another to create the curve in the printhead (400) via the CTE differential between the layers (401, 402). Further, the tacky state of the first EMC layer (401) ensures a level of cross-linking is present such that the first and second EMC layers (401, 402) remain segregated and that intermixing of the first and second EMC layers (401, 402) is minimized or eliminated.

Figure 7A:
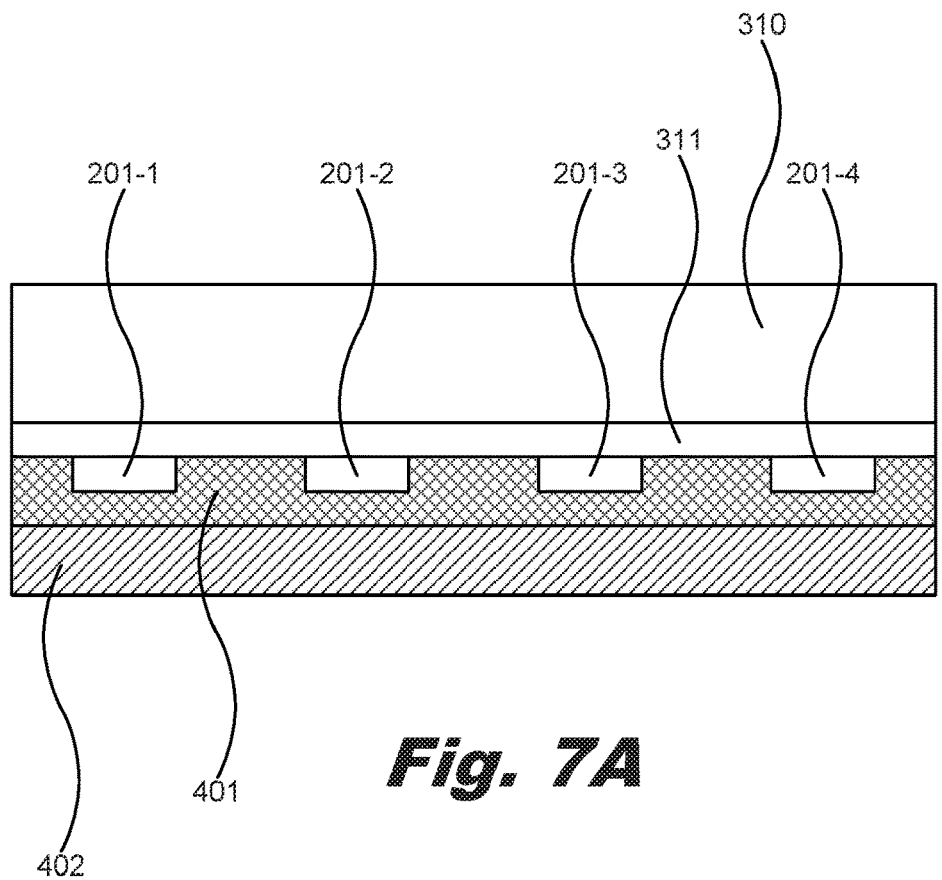
Figure 7B:
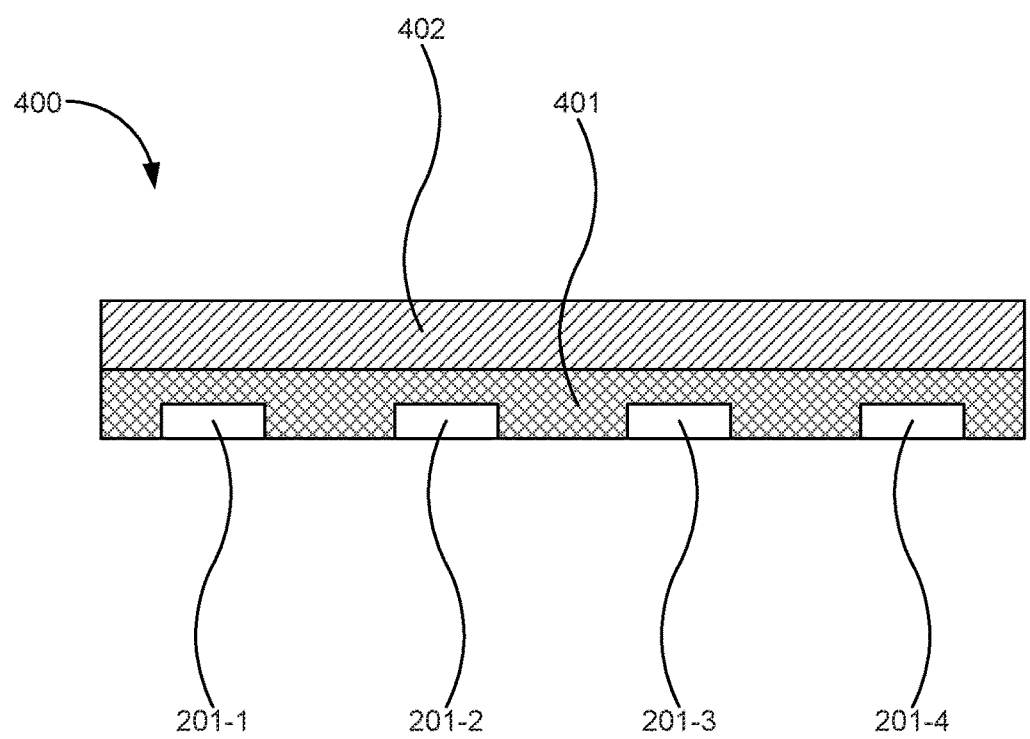

In both of the above examples, partially-cured EMC layers (401, 402) are depicted in FIG. 7A where the dies (201) are overmolded with the first EMC layer (401), the second EMC layer (402) is coupled to the first EMC layer (401), and the temporary substrate (310) is adhered to the dies (201) and the first EMC layer (401) via the adhesive layer (311). In FIG. 7B, the adhesive layer (311) and temporary substrate (310) are removed. The orientation of the dies (201) and the EMC layers (401, 402) is flipped about the horizontal axis between FIGS. 7A and 7B.

Figure 8A:
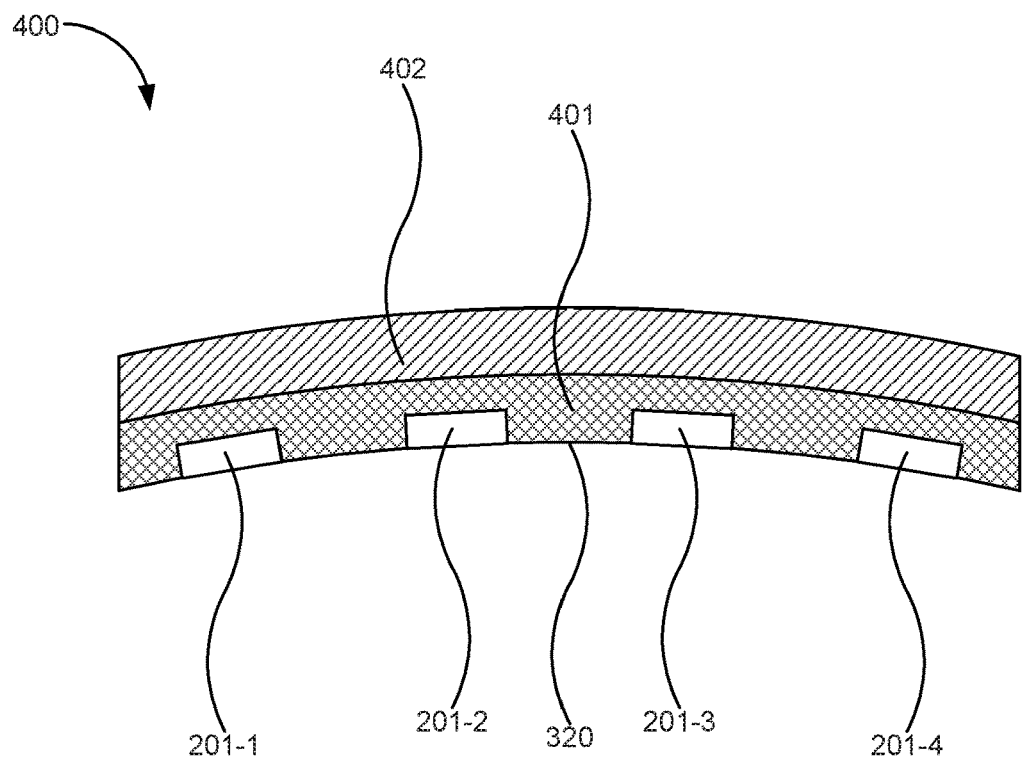
Figure 8B:
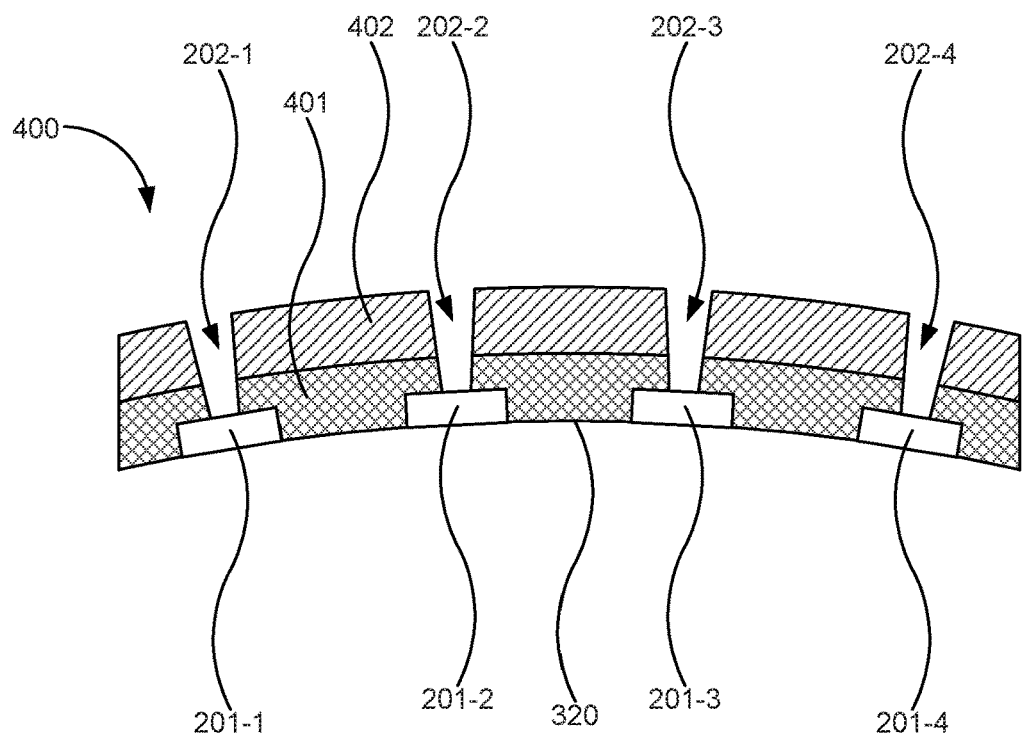

In FIG. 8A, the first and second EMC layers (401, 402) have fully cured. Due to the CTE difference between the material of the dies (201) and the EMC of the first and second EMC layers (401, 402), a curvature (320) is created in the printhead (400). Specifically, the first EMC layer (401) may have a relatively higher CTE relative to the dies (201) and the second EMC layer (402). In the example of FIGS. 6 through 8B where a first EMC layer (401) and a second EMC layer (402) are used, the CTE of the dies (201) may again be approximately 3.1 ppm//° C., the CTE of the first EMC layer (401) may be approximately 13 ppm/° C., and the CTE of the second EMC layer (402) may be approximately 8 ppm/° C. In this example, because the CTE of the first EMC layer (401) is relatively higher than the CTE of the second EMC layer (402) and because the CTE of the dies (201) is relatively lower than the CTE of the first EMC layer (401), this creates the concave curvature upon curing of the first and second EMC layers (401, 402). Thus, in this example, after the dies (201) and that the first and second EMC layers (401, 402) are released from the receptacle (305) between FIGS. 6 and 7A, the printhead (400) may be flat because the CTE of the silicon of the dies (201) assist in balancing out the shrinkage with the first and second EMC layers (401, 402) during cooling. However, as the printhead (400) cools and the first and second EMC layers (401, 402) continue to cross-link, the printhead (400) will begin to form the curve (320) as depicted in FIGS. 8A and 8B.

As depicted in FIG. 8B, fluid feed channels (202) formed in both the first and second EMC layers (401, 402). Again, the fluid feed channels (202) serve to feed a printing fluid to the fluid ejection dies (201). In one example, the fluid feed channels (202) may be formed by removing portions of the first and second EMC layers (401, 402) to form the fluid feed channels (202). Removal of the portions of the first and second EMC layers (401, 402) may include cutting, mechanical etching, chemical etching, or other material removal processes. In another example, the fluid feed channels (202) may be formed through a molding process where the non-ejection sides of the dies (201) are interfaced with a protruding portion of a mold.

FIG. 9 is a block diagram of a mold (900) for use in shaping a printhead (200, 300, 400), according to an example of the principles described herein. As described herein, the curvature of the printhead (200) may be formed by placing the layer(s) of EMC (210, 301, 401, 402) and the dies (201) into the mold (900) that is shaped to include a curve (320-1, 320-2) as depicted in FIG. 9. Two halves (901, 902) of the mold (900) each include the curve (320-1, 320-2) that matches the curvature of the print medium (150) created by the roller (180) and the movement of the print medium (150) over the roller (180). In this example, the mold cavity (903) with the curved surfaces (320-1, 320-2) may be used to shape the printhead (200, 300, 400) alone or in combination with the layers(s) of EMC (210, 301, 401, 402) with their respective CTEs. The type of molding processes used in connection with this example of molding may include, for example, compression molding, transfer molding, injection molding, or combinations thereof. In one example, the two halves (901, 902) of the mold (900) may include a matching curved shape (320-1, 320-2) to create the curved printhead surface. In another example, the two curved surfaces (320-1, 320-2) may be different to create different radii of curvature on the two sides of the printhead (200, 300, 400).

Figure 10:
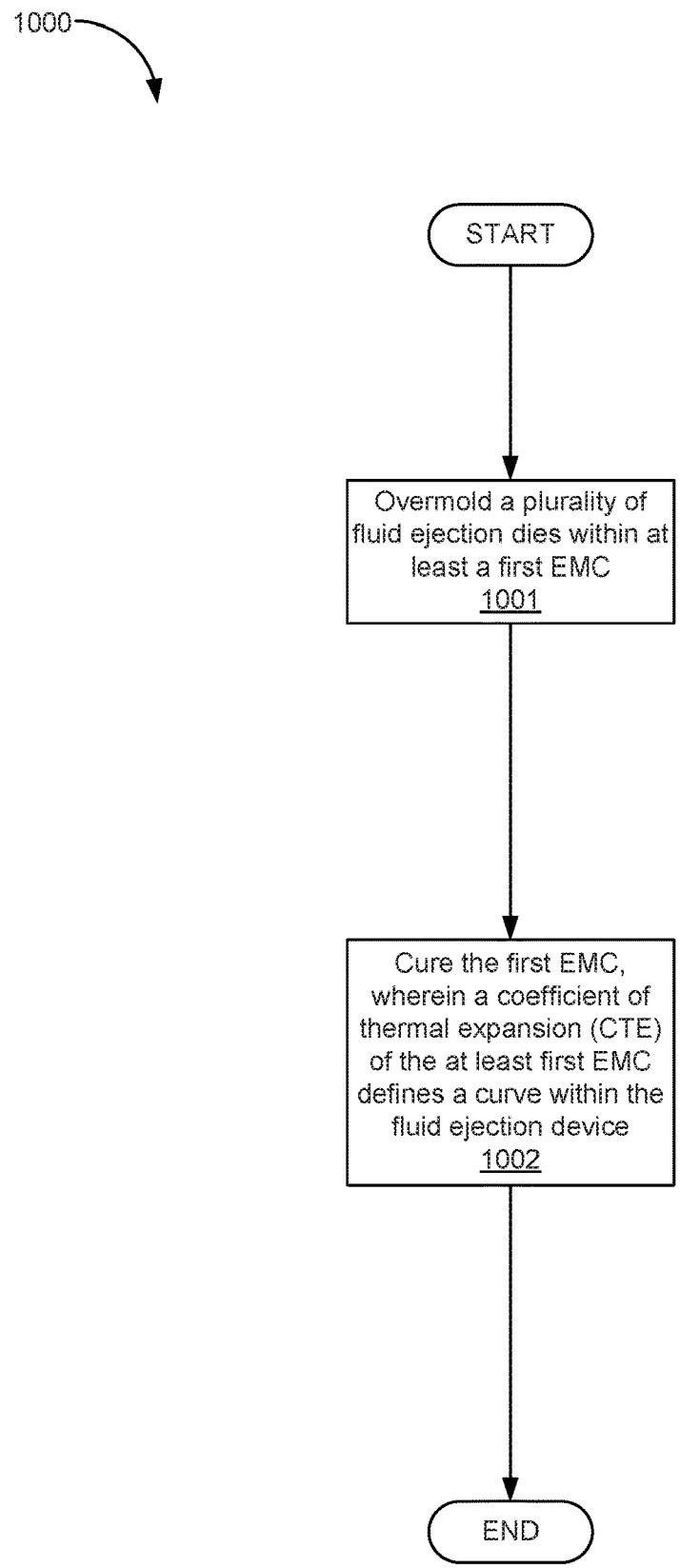
FIG. 10 is a flowchart showing a method of manufacturing a fluid ejection device, according to an example of the principles described herein.

FIG. 10 is a flowchart showing a method (1000) of manufacturing a fluid ejection device (200, 300, 400), according to an example of the principles described herein. The method (1000) of FIG. 10 may include overmolding (block 1001) a plurality of fluid ejection dies (201) within at least a first EMC layer (210, 301, 401, 402). In one example, a plurality of EMC layers (210, 301, 401, 402) may be used to overmold the dies (201). The at least first EMC layer (210, 301, 401, 402) may be cured (1002) wherein a coefficient of thermal expansion (CTE) of the at least first EMC layer (210, 301, 401, 402) defines a curve (320) within the fluid ejection device (200, 300, 400). In this manner, the printhead (200, 300, 400) or fluid ejection device may be formed to match the curvature of the print medium (150) created by the roller (180) and the movement of the print medium (150) over the roller (180).

Figure 11:
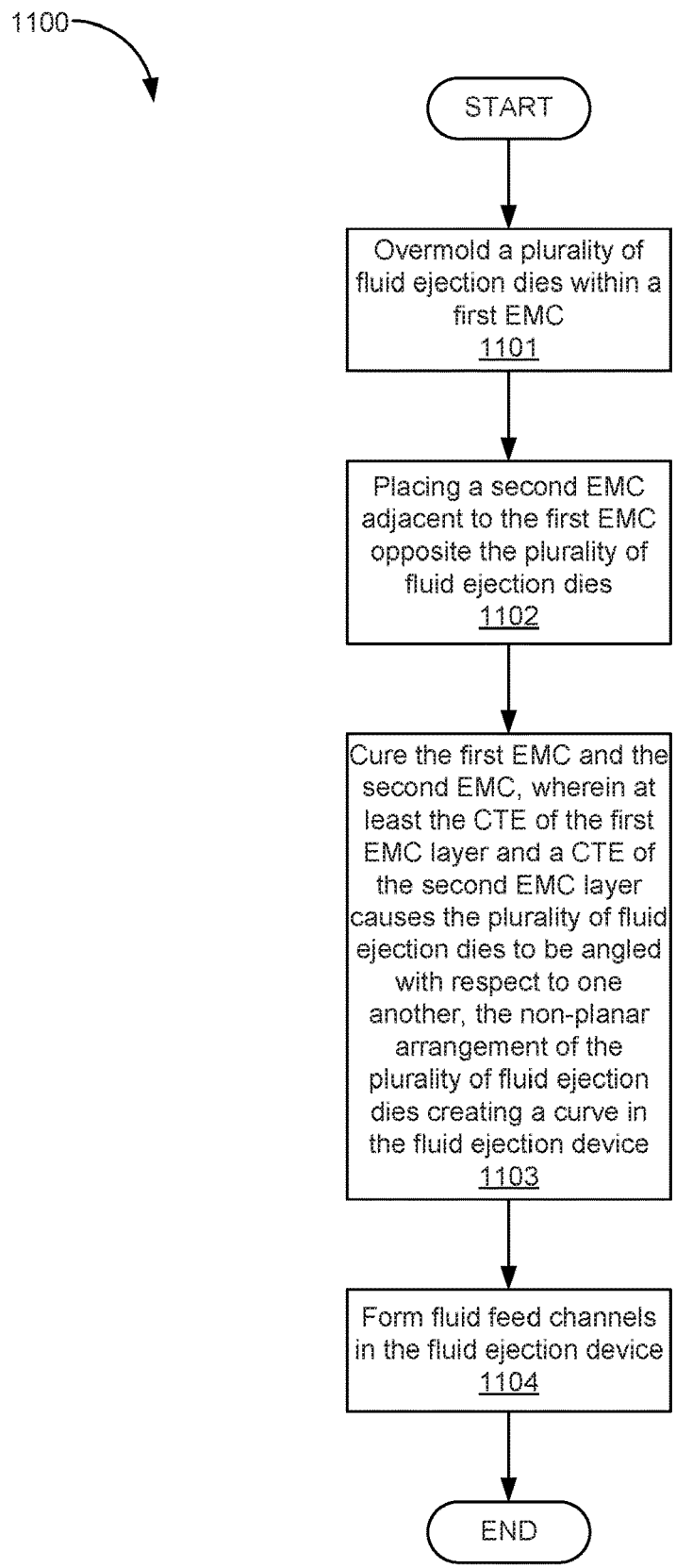
FIG. 11 is a flowchart showing a method of manufacturing a fluid ejection device, according to an example of the principles described herein.

FIG. 11 is a flowchart showing a method (1100) of manufacturing a fluid ejection device (200, 300, 400), according to an example of the principles described herein. The method (1100) of FIG. 11 may include overmolding (block 1101) a plurality of fluid ejection dies (201) within a first EMC layer (401). A second EMC layer (402) may be placed (1102) adjacent to the first EMC layer (401) opposite the plurality of fluid ejection dies (201). In one example, the first and second EMC layers (401, 402) are overmolded around the dies (201) simultaneously such that both EMC layers (401, 402) are cured simultaneously. In another example, the first EMC layer (401) may be allowed to cure, and the second EMC layer (402) may applied to the first EMC layer (401). In this example, the second EMC layer (402) may be applied to the first EMC layer (401) before the first EMC layer (401) is completely cured and is tacky. This allows the second EMC layer (402) to adhere to the first EMC layer (401), and allows the CTEs of the first and second EMC layers (401, 402) to interact with one another to create the curve in the printhead (400) via the CTE differential between the layers (401, 402). Further, the tacky state of the first EMC layer (401) ensures a level of cross-linking is present such that the first and second EMC layers (401, 402) remain segregated and that intermixing of the first and second EMC layers (401, 402) is minimized or eliminated.

The method (1100) may also include curing (block 1103) the first EMC layer (401) and the second EMC layer (402) according to the examples described above. The CTE of the first EMC layer (401) and a CTE of the second EMC layer (402) causes the plurality of fluid ejection dies (201) to be angled with respect to one another. The non-planar arrangement of the plurality of fluid ejection dies (201) creates a curve (320) in the fluid ejection device (200, 300, 400).

The method (1100) may include forming (1104) fluid feed channels (202) in the first EMC layer (401) and second EMC layer (402) of the fluid ejection device (200, 300, 400). Again, forming (1104) the fluid feed channels (202) may include cutting, mechanical etching, chemical etching, or other material removal processes. In another example, the fluid feed channels (202) may be formed through a molding process where the non-ejection sides of the dies (201) are interfaced with a protruding portion of a mold.

Figure 12:
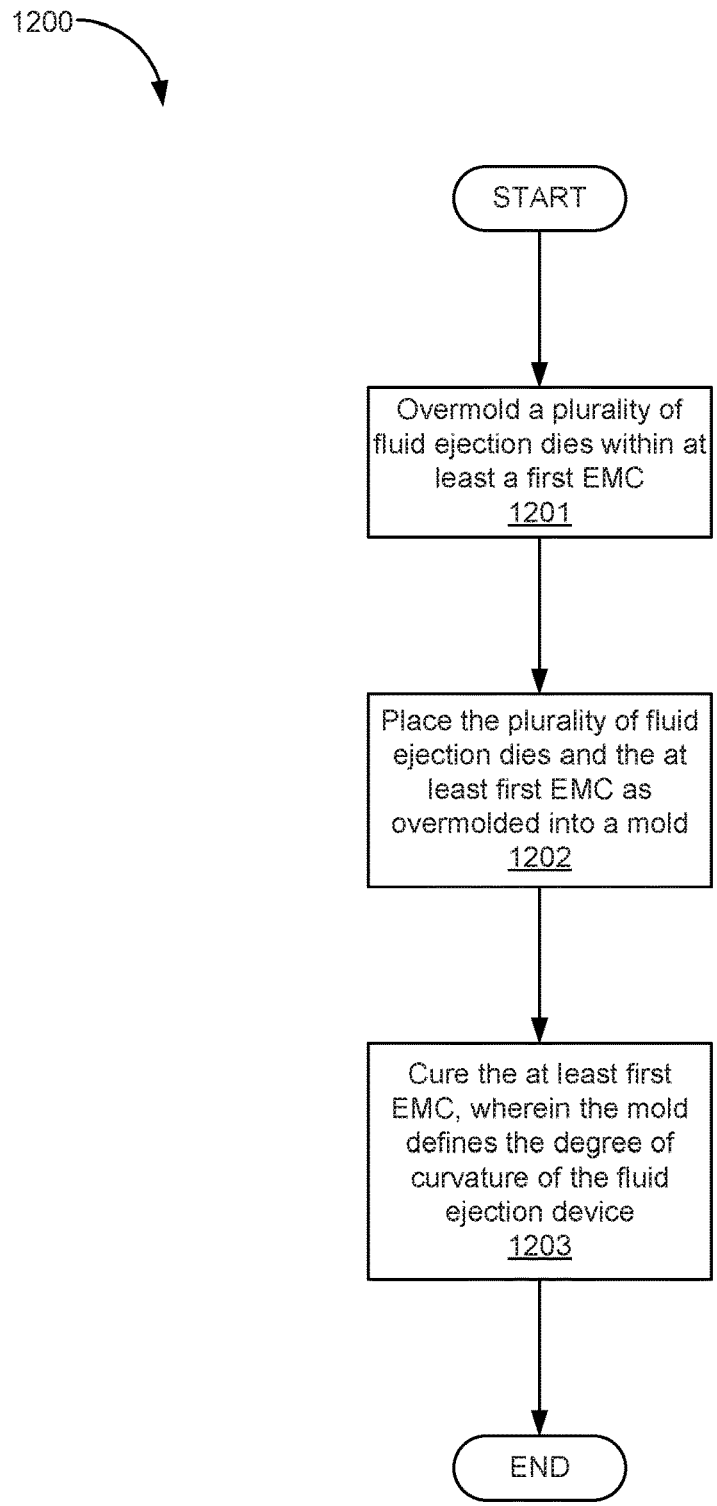
FIG. 12 is a flowchart showing a method of manufacturing a fluid ejection device, according to an example of the principles described herein.

FIG. 12 is a flowchart showing a method (1200) of manufacturing a fluid ejection device (200, 300, 400), according to an example of the principles described herein. The method (1200) may include overmolding (block 1201) a plurality of fluid ejection dies (201) within at least a first EMC layer (210, 301, 401, 402). The overmolded dies (201) may then be placed (block 1202) into the mold (900) of FIG. 9. The at least first EMC layer (210, 301, 401, 402) may then be cured (block 1203). The mold (900) defines the degree of curvature of the fluid ejection device (200, 300, 400) due to the curves (320-1, 320-2) that define the mold cavity (903) of the mold. In one example, the mold cavity (903) with its curved surfaces (320-1, 320-2) may be used to shape the printhead (200) alone or in combination with the layers(s) of EMC (210, 301, 401, 402) alone or in combination with their respective CTEs.

The specification and figures describe a curved printhead device may include a plurality of fluid ejection dies overmolded with at least one layer of epoxy mold compound (EMC). Each of the fluid ejection dies and the EMC include a coefficient of thermal expansion (CTE). The combination of the CTE of the fluid ejection dies and the CTE of the at least one layer of EMC defines a curve within the curved printhead.

The systems and methods described herein provide a curved printhead that matches the radius of a print medium moved within a printing device over a roller. Since the overmolded dies are much narrower than other dies, it is much easier to integrate the dies in a curved and insert molded printhead. This curved printhead assists in minimizing the deviation of head-to-paper spacing and increase the usable print zone. As a result, the print quality is increased and print defects are minimized or eliminated. Further, a curved printhead provides tighter head to paper spacing control and a wider print zone, and reduces costs through a simplified paper path.

The preceding description has been presented to illustrate and describe examples of the principles described. This description is not intended to be exhaustive or to limit these principles to any precise form disclosed. Many modifications and variations are possible in light of the above teaching.

What is claimed is:

1. A curved fluid ejection device, comprising:
a plurality of fluid ejection dies overmolded with at least one layer of epoxy mold compound (EMC), each of the fluid ejection dies and the EMC comprising a coefficient of thermal expansion (CTE),
wherein the combination of the CTE of the fluid ejection dies and the CTE of the at least one layer of EMC defines a curve within the curved fluid ejection device.

2. The curved fluid ejection device of claim 1, wherein the curve matches a radius of a print medium over a roller within a printing device.

3. The curved fluid ejection device of claim 1, wherein:
the at least one layer of EMC comprises two layers of EMC, the two layers of EMC comprising:
a first layer of EMC comprising a first CTE, and
a second layer of EMC comprising a second CTE.

4. The curved fluid ejection device of claim 3, wherein the degree of curvature of the curved fluid ejection device is defined by a thickness of a silicon layer of the ejection dies, a CTE of the silicon layer, a thickness of the first layer of EMC, the first CTE of the first layer of EMC, a thickness of the second layer of EMC, the second CTE of the second layer of EMC, a sequence of the first layer of EMC and the second layer of EMC within the curved fluid ejection device, a Young's modulus of the materials used within the layers of the fluid ejection device, changes in temperature during and after a curing process, the locations and relative positions of the layers of the fluid ejection device, or combinations thereof.

5. The curved fluid ejection device of claim 1, comprising fluid feed channels formed in the at least one layer of EMC to feed a printing fluid to the fluid ejection dies.

6. A printing system, comprising:
a roller to convey a print medium; and
a fluid ejection device to eject fluid onto the print medium, the fluid ejection device comprising:
a plurality of fluid ejection dies;
a first epoxy mold compound (EMC) layer overmolding the plurality of fluid ejection dies; and
a second EMC layer applied adjacent to the first EMC layer opposite the plurality of fluid ejection dies,
wherein the combination of a first CTE of the fluid ejection dies, a second CTE of the first EMC layer, and a third CTE of the second layer of EMC defines a curve in the fluid ejection device.

7. The printing system of claim 6, wherein the curing of the first EMC and the second EMC causes the plurality of fluid ejection dies to be non-planar with respect to one another, the non-planar arrangement of the plurality of fluid ejection dies creating the curve in the fluid ejection device.

8. The printing system of claim 6, wherein the curve matches a radius of the print medium over the roller within the printing system.

9. The printing system of claim 6, wherein the degree of curvature of the fluid ejection device is defined by thicknesses of the first EMC layer and the second EMC layer, the CTE of the fluid ejection dies, the first EMC layer and the second EMC layer, a position of the first EMC layer and the second EMC layer relative to the fluid ejection dies, a Young's modulus of the materials used within the layers of the fluid ejection device, changes in temperature during and after a curing process, the locations and relative positions of the layers of the fluid ejection device, or combinations thereof.

10. The printing system of claim 6, wherein the curve maintains each of the fluid ejection dies equidistant from the print medium.

11. A method of manufacturing a fluid ejection device, comprising:
overmolding a plurality of fluid ejection dies within at least a first epoxy mold compound (EMC); and
curing the first EMC,
wherein a coefficient of thermal expansion (CTE) of the at least first EMC defines a curve within the fluid ejection device.

12. The method of claim 11, comprising:
placing a second EMC adjacent to the first EMC opposite the plurality of fluid ejection dies; and
curing the second EMC,
wherein at least the CTE of the first EMC layer and a CTE of the second EMC layer causes the plurality of fluid ejection dies to be non-planar with respect to one another.

13. The method of claim 11, comprising:
placing the plurality of fluid ejection dies and the first EMC as overmolded into a mold; and
curing the first EMC,
wherein the mold defines the degree of curvature of the fluid ejection device.

14. The method of claim 11, comprising forming fluid feed channels in the fluid ejection device.

15. The method of claim 11, wherein the degree of curvature of the curved fluid ejection device is defined by a thickness of the fluid ejection dies, a CTE of the material of the fluid ejection dies, a thickness of a layer of the first EMC, the CTE of the first EMC, a thickness of a second layer of EMC applied to a side of the first EMC opposite the plurality of fluid ejection dies, a CTE of the second layer of EMC, a sequence of the first layer of EMC and the second layer of EMC within the curved fluid ejection device, a Young's modulus of the materials used within the layers of the fluid ejection device, changes in temperature during and after a curing process, the locations and relative positions of the layers of the fluid ejection device, or combinations thereof.

\* \* \* \* \*